Patented Oct. 23, 1934

1,978,062

UNITED STATES PATENT OFFICE 1,978,062

CONDENSATION PRODUCT OF THE ANTHRACENE SERIES AND PROCESS OF MAKING SAME

Heinz Scheyer, Frankfort-on-the-Main, Germany, assignor to General Aniline Works, Inc., New York, N. Y., a corporation of Delaware No Drawing. Application April 12, 1933, Serial No. 665,841. In Germany May 3, 1932

8 Claims. (Cl. 260—61)

My present invention relates to condensation products of the anthracene series and process of making same.

According to this invention products which may be used for dyeing or as intermediates for dyestuff production are manufactured by condensing methylene-anthrone or its nuclear substitution products with compounds containing one or more times the grouping—CH=CH—in a suitable configuration. Said grouping—CH=CH—is present in a cyclic configuration for example in the quinoid nuclei of quinoid compounds such as toloquinone, α- and β-naphthoquinone, naphthazarine, inden or in an open chain the compounds belonging in the latter case to the aliphatic or to the aliphatic-aromatic series.

Particularly suitable are those compounds in which in an adjacent position to the grouping—CH=CH—stand a carbonyl group or an aryl residue or similar residues. As such reaction components, for instance, maleic acid anhydride, fumaric acid, cinnamic acid or its esters, crotonic acid and aldehyde, benzalacetophenone, stilben and styrol may be named. In this case the reactivity is increased since the grouping—CH=CH— is activated by the presence of the substituent of the stated type in an adjacent position.

But likewise such substitution products of compounds of the aforesaid type can be used in which a hydrogen atom of the grouping—CH=CH— is replaced by halogen, such as for example 2.5.6-trichloro-benzoquinone or 2-chloro-α-naphthoquinone or by a hydroxyl-group which may be protected by being converted in an ether or ester group, such as vinyl-ether or vinyl-acetate.

The condensation reaction probably proceeds mainly according to the diensynthesis of Diels (Annalen, vol. 460, page 98 ff.), i. e. by adding the methylene-anthrone complex (or that of its substitution products) to the double bond of the second reaction component, the carbon atom of the methylene group and a carbon atom standing in one of the α-position of the side nuclei of the methylene-anthrone and in peri-position to the methylene group taking part in the reaction. Subsequently probably in most cases an oxidation or dehydrogenation of the primary addition products occurs, products poorer in hydrogen of aromatic character being mainly formed. It is therefore an advantage to carry out the present process with the addition of an oxidizing or dehydrogenating agent which is wholly or partly replaceable by an excess of the second reaction component.

When the second reaction component is an orthoquinone compound as for instance β-naphthoquinone the course of the reaction is otherwise, but not at present known.

When using such compounds which contain in their molecule a plurality of double bonds of the aforesaid kind such as benzoquinone or butadiene, either one or more of said double bonds can react with each molecule of methylene-anthrone or its substitution products. For instance benzoquinone is capable of reacting either with one or with two molecules of methylene-anthrone.

When using aliphatic or aliphatic-aromatic carboxylic acids as second reaction component during the course of the condensation reaction carbonic acid ($CO_2$) may be split off.

The present condensation reaction may be likewise carried out by using instead of such quinoid or aliphatic or aliphatic-aromatic compounds of the aforesaid kind such starting materials which are capable of being converted intermediately under the conditions applied into said compounds, such as α-naphthoquinone-dichloride or β-chloropropionic acid.

The present condensation reaction may be advantageously carried out by heating the components as such or in the presence of a suitable diluent at relatively high temperatures. As such diluents, for instance, glacial acetic acid, nitrobenzene, trichlorobenzene, etc. may be named. In a given case when working with an excess of the second reaction component this excess may serve simultaneously as diluent. In many cases, such as for example when using such initial products, from which during the reaction hydrohalic acid is split off, an acid binding agent such as sodium acetate may advantageously be added.

The colored reaction products some of which are new compounds mostly precipitate immediately in a pure well crystallized form. According to their chemical behavior they are to be considered as benzanthrone derivatives containing in bz-1- or bz-2-position or in both positions a substituent. Partly they are converted by the action of an alkaline hydrosulfite solution into leuco compounds which may be used, as far as they are water-soluble, for dyeing the textile fibers. Besides the present condensation products may be used as intermediates for the production of further dyestuffs.

The products corresponding probably to the general formula

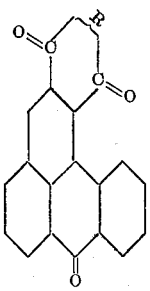

wherein R stands for —O— or —CH=CH— or the radical

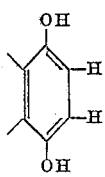

are new and technically important compounds.

In order to further illustrate my invention the following examples are given, the parts being by weight and all temperatures in centigrade degrees; but it is, however, to be understood that my invention is not limited to the particular products nor reacting conditions mentioned therein.

*Example 1*

10.3 parts of methylene-anthrone are mixed with 15.8 parts of α-naphthoquinone and about 100 parts of ethyl-alcohol and the mixture is slowly heated to boiling while stirring. The reaction components thereby slowly become dissolved and yet before the liquor is coming to boiling the separation of the condensation product begins in the form of orange-yellow crystals which finally fill up whole the liquor. After some time the condensation product is filtered off and washed out with alcohol. The condensation product is according to its chemical and physical properties identical with the condensation product obtainable by condensing benzanthrone and phthalic acid anhydride according to U. S. Patent No. 1,582,475 of the following probable formula It dissolves in concentrated sulfuric acid with a yellowish red color and forms a green vat, from which cotton is dyed fast yellow shades.

*Example 2*

10.3 parts of methylene-anthrone are mixed with 10.4 parts of 2-chloro-α-naphthoquinone, about 10 parts of sodium acetate and about 100 parts of glacial acetic acid and the mixture is slowly heated while stirring to boiling. Slowly an entire solution is formed and before the beginning of boiling the condensation product separates in a well crystallized form. Shortly boiling is continued while stirring and the precipitate is filtered off while warm and washed out with glacial acetic acid and water. The reaction product is apparently identical with the product of Example 1.

Instead of 2-chloro-α-naphthoquinone one may use as second component likewise the α-naphthoquinone-dichloride which advantageously previously before adding methylene-anthrone may be shortly heated to boiling with the addition of sodium acetate and glacial acetic acid.

*Example 3*

A mixture of 10.3 parts of methylene-anthrone, 10.8 parts of benzoquinone and about 100 parts of glacial acetic acid is slowly heated to boiling while well stirring. At first an entire solution is formed and after a short time the separation of a red precipitate begins. For about half an hour the boiling is continued. Then the precipitate is filtered off, washed out with glacial acetic acid and water and dried. By treatment with organic solvents such as hot chlorobenzene it can be separated into the different compounds, the more soluble of which for instance from chloro-benzene is obtained as red crystals soluble in sulfuric acid with a yellowish red color. This compound yields with an alkaline hydrosulfite solution even in the cold an intense bluish green vat. The other compound, which is nearly insoluble in chlorobenzene crystallizes from nitrobenzene as fine orange needles. The leuco-compound thereof dissolves in water only after the addition of alcohol with an olive color. The first more soluble compound has been as I assume formed by decomposing one molecular proportion of methylene-anthrone with one molecular proportion of benzoquinone thus corresponding to the probable formula

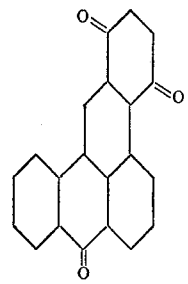

The less soluble second compound has been as I assume formed by the action of 2 molecular proportions of methylene-anthrone on 1 molecular proportion of benzoquinone thus corresponding probably to one of the following formulæ:

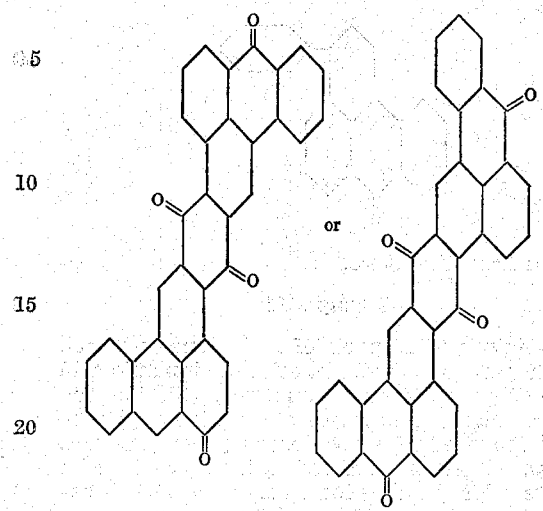

Both compounds are new.

Example 4

A mixture of 10 parts of methylene-anthrone, 12 parts of toluquinone and about 100 parts of glacial acetic acid is slowly heated to boiling while stirring. The reaction components slowly become dissolved and the coloration of the liquor turns to yellow. After some minutes the separation of a crystalline orange red precipitate begins which finally is filling up whole the liquor as a compact pulp of crystals. The reaction products consists apparently of two isomeric compounds of the following probable formulæ

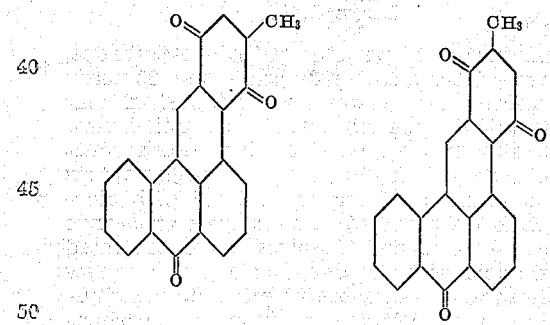

Both new compounds do not differ essentially as to solubility in the usual organic solvents. They dissolve in the alkaline hydrosulfite vat with a bluish green, in concentrated sulfuric acid with an orange red color.

When replacing the toluquinone by the corresponding amount of 2.5-trichloro-benzoquinone, a new chlorine containing condensation product is obtained which is in its properties very similar to that from toluquinone.

Example 5

10.3 parts of methylene-anthrone are mixed with 16 parts of β-naphthoquinone and about 100 parts of glacial acetic acid and the mixture is boiled for some time in an apparatus provided with a reflux condenser. The coloration of the liquor turns to red and after shortly boiling the separation of the new condensation product as greenish crystals of metallic lustre is beginning. After some time the precipitate is separated from the liquor while hot. It represents when dry a violet crystalline green powder of metallic lustre. It dissolves in concentrated sulfuric acid with a green, in an aqueous alcoholic caustic alkali solution with a blue, in the alkaline hydrosulfite vat with a red color. It differs, as I assume, in its chemical constitution from the other condensation products. Perhaps it corresponds to the following formula:

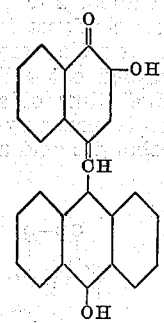

Example 6

12 parts of methylene-2-chloro-anthrone are mixed with 16 parts of α-naphthoquinone and about 120 parts of glacial acetic acid and the mixture is heated for some time to boiling while stirring in an apparatus provided with a reflux condenser. Then the condensation product which perhaps corresponds to the formula

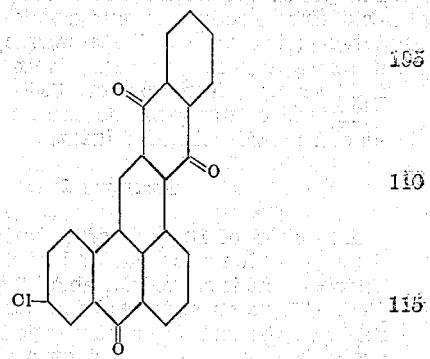

is filtered off while hot and washed out with glacial acetic acid. It dyes from a green vat cotton yellow shades of a good fastness.

One may likewise start from 1-chloro-methylene-anthrone.

Example 7

A mixture of 10.3 parts of methylene-anthrone, 10 parts of pure naphthazarine and about 50 parts of nitro-benzene is heated while stirring to about 180°. After a very short time the liquor solidifies forming a compact pulp of red prisms. When the reaction is complete the precipitate is filtered off. The new product dissolves in concentrated sulfuric acid with a dichroic bluish red color turning to blue after the addition of boric acid. The new compound probably corresponds to the formula

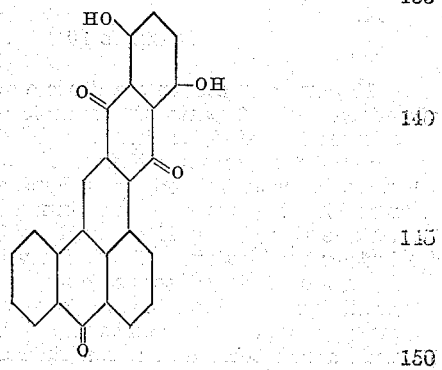

Example 8

10 parts of methylanthrone are condensed with 10 parts of maleic acid anhydride by heating the mixture in the presence of about 30 parts of nitrobenzene for about 2 hours at about 180°. When cool the new condensation product separates in the form of yellow crystals which are filtered off and washed out with alcohol. The condensation product thus obtained in a very pure state represents probably the bz-1-bz-2-benzanthrone dicarboxylic acid anhydride of the formula

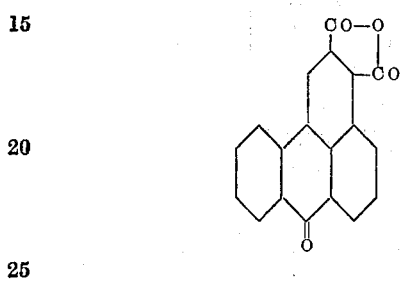

The new compound represents a yellow crystalline powder, it dissolves in concentrated sulfuric acid with a yellow color and a yellow fluorescence. When boiled with a dilute caustic soda solution it forms a yellow solution of an intense green fluorescence. It melts above 300°.

Instead of nitrobenzene one may likewise use glacial acetic acid as diluent.

Example 9

A mixture of 10 parts of methylene-anthrone, 6 parts of fumaric acid and about 30 parts of nitrobenzene is stirred for about 2 hours at about 180°. While strongly evolving carbonic acid already in the hot the condensation product separates in a well crystallized form. At about 100° the precipitate is filtered off. In this manner pure bz-2-benzanthrone-carboxylic acid of the formula

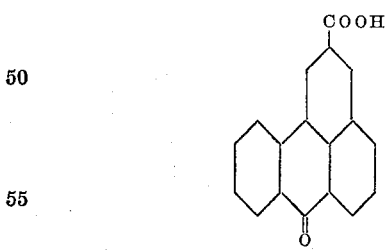

is obtained, being identical with the product described in Ber.d.deutsch.Chem.Ges., vol. 50, page 294.

Example 10

10 parts of methylene-anthrone are intimately mixed with 30 parts of cinnamic acid and the mixture is heated for about 2 hours at about 180°. The hot reaction mass then is poured on ice and extracted with hot sodium carbonate solution for removing the excess of the cinnamic acid. The residue may be handled with cold alcohol for further purification. When recrystallized from for instance glacial acetic acid the condensation product is obtained in the form of big yellow crystals soluble in concentrated sulfuric acid with a red color and a red fluorescence. The product melts at about 179° and is identical with bz-1-phenyl-benzanthrone of the formula

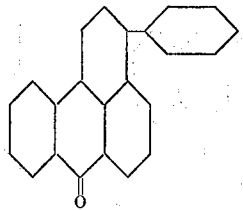

known from literature.

Example 11

A mixture of 10 parts of methylene-anthrone and 20 parts of the ethylic ester of cinnamic acid is shortly heated to boiling. By diluting the cooled reaction mass with alcohol the new condensation product separates as yellow crystals. It dissolves in concentrated sulfuric acid with an orange color and a yellow fluorescence. As I assume it represents a phenyl-benzanthrone-carbonic acid ethylester of the probable formula

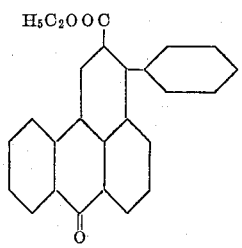

Example 12

A mixture of 10 parts of methylene-anthrone, 10 parts of crotonaldehyde and about 30 parts of nitrobenzene is heated for about half an hour at about 180° while stirring. The reaction mass is cooled down and the new condensation product which separates in the form of bright yellow prisms is filtered off and washed out with alcohol. It forms with hydrazine hydrate an orange colored aldazine and dissolves in concentrated sulfuric acid with an orange color and a yellow fluorescence. As I assume it represents a methyl-benzanthrone-aldehyde corresponding perhaps to the formula

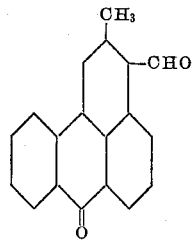

Example 13

10 parts of methylene-anthrone are mixed with 11 parts of benzalacetophenone and about 30 parts of nitrobenzene and the mixture is heated while stirring for about 1 hour at about 180°. When cool the condensation product separates as yellow crystals which are filtered off and washed out with alcohol. For further purification it may be recrystallized for instance from glacial acetic acid. The new product which dissolves in sulfuric acid with an orange color and a yellow fluorescence is, as I assume, a phenyl-benzoyl-benzanthrone perhaps of the formula

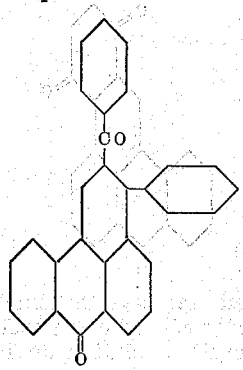

*Example 14*

A mixture of 10 parts of methylene-anthrone, 10 parts of styrol and about 30 parts of nitrobenzene is heated while stirring for about 2 hours at about 180°. When cool the reaction mass is diluted with petrolether and the formed reaction product which separates as yellow crystals is filtered off. It represents the bz-1-phenyl-benzanthrone and is identical with the product obtained according to Example 10.

*Example 15*

A mixture of 10 parts of methylene-anthrone, 10 parts of β-chloro-propionic acid, about 10 parts of sodium acetate and about 30 parts of nitrobenzene is heated while stirring for 2 hours at about 180°. Then the diluent is expelled by a steam distillation. The reaction product is extracted with a boiling dilute sodium carbonate solution in order to remove the benzanthrone-carboxylic acid besides other by-products. As an insoluble residue bezanthrone remains which may be purified by recrystallization for instance from glacial acetic acid.

*Example 16*

10 parts of methylene-2-chloroanthrone are mixed with 6 parts of fumaric acid and about 30 parts of nitrobenzene and the mixture is heated while stirring for about 2 hours at about 180°. When cool the formed precipitate is filtered off and washed out. It may be purified by dissolving it in a hot sodium carbonate solution and precipitating it with an acid. When recrystallized from nitrobenzene it is obtained as fine yellow needles which dissolve in concentrated sulfuric acid with an orange color and fluorescence. The new compound represents probably the 6-chloro-benzanthrone-bz-2-carboxylic acid of the probable formula

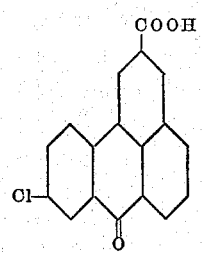

When replacing the fumaric acid by the corresponding quantity of maleic acid a chlorine containing bz-bz-2-benzanthrone-dicarboxylic acid anhydride is obtained.

One may likewise start from 2-methyl-methylene-anthrone.

*Example 17*

A solution of 10 parts of methylene-anthrone in about 30 parts of nitrobenzene is while introducing simultaneously a slow current of butadiene heated to about 180° and the reaction mass is kept for about further 2 hours at this temperature while further introducing butadiene. When cool a precipitate separates which is filtered off. It may be purified by extracting it with hot organic diluents such as glacial acetic acid. The residue is a pure bz-1-bz-1'-dibenzanthronyl of the formula

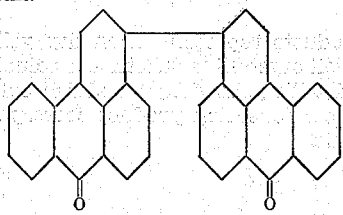

in the form of an intense yellow crystalline powder.

What I claim is:

1. A process for making condensation products of the anthracene series which comprises condensing a methylene-anthrone compound with an organic compound containing at least once the grouping —CH=CH—, one hydrogen atom of which may be replaced by halogen or a protected hydroxyl-group.

2. A process for making condensation products of the anthracene series which comprises condensing a methylene-anthrone compound with an organic compound containing at least once the grouping —CH=CH—, one hydrogen atom of which may be replaced by halogen or a protected hydroxyl-group and containing in the case of only one grouping —CH=CH— being present in at least one adjacent position thereto a substituent of the group consisting of carbonyl (C=O) and phenyl.

3. A process for making condensation products of the anthracene series which comprises condensing a methylene-anthrone compound with an organic compound which is capable of being converted intermediately under the conditions applied into a compound containing at least once the grouping —CH=CH— and containing in the case of only one grouping —CH=CH— being present in at least one adjacent position thereto a substituent of the group consisting of carbonyl (C=O) and phenyl.

4. A process for making condensation products of the anthracene series which comprises condensing a methylene-anthrone compound with a quinoid compound containing at least once the grouping —CH=CH—, one hydrogen atom of which may be replaced by halogen or a protected hydroxyl-group.

5. The condensation products corresponding to the general formula

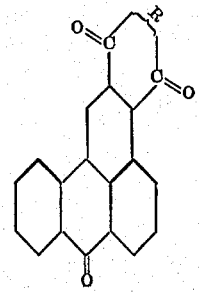

wherein R stands for —O— or —CH=CH— or the radical

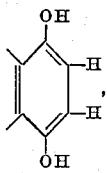

which products represent when dry yellowish to reddish well crystalline substances soluble in sulfuric acid with yellowish to reddish color.

6. The condensation product corresponding to the formula

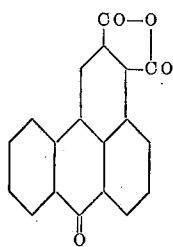

which product is a yellow crystalline powder melting above 300°, dissolving in sulfuric acid with a yellow color and a yellow fluorescence, forming a yellow solution of an intense green fluorescence when boiled with a dilute caustic soda solution.

7. The condensation product corresponding to the formula

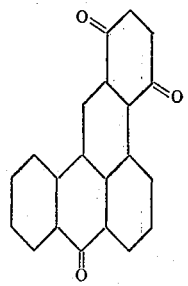

which represents red crystals soluble in sulfuric acid with a yellowish red color, yielding with an alkaline hydrosulfite solution an intense bluish green vat.

8. The condensation product corresponding to the formula

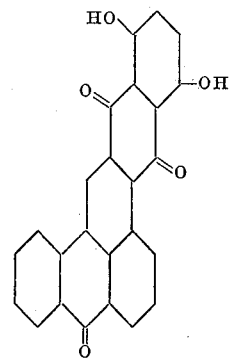

which product forms red prisms, dissolving in sulfuric acid with a dichroic bluish red color turning to blue after the addition of boric acid.

HEINZ SCHEYER.